United States Patent [19]

Hanson

[11] 3,763,370

[45] Oct. 2, 1973

[54] X-RAY FILM SEQUENCES

[76] Inventor: Howard A. Hanson, 2268A Market St., San Francisco, Calif. 94114

[22] Filed: Sept. 17, 1971

[21] Appl. No.: 181,522

[52] U.S. Cl. .................................... 250/470
[51] Int. Cl. ............................... G01n 21/00
[58] Field of Search .............. 250/66, 68, 61.5, 250/58

[56] References Cited
UNITED STATES PATENTS

| | | | |
|---|---|---|---|
| 1,239,146 | 2/1914 | Wantz | 250/66 |
| 2,640,160 | 5/1953 | Collins | 250/66 |
| 3,349,242 | 10/1967 | Braestrup | 250/61.5 |
| 3,624,398 | 11/1971 | Arndt | 250/66 |

FOREIGN PATENTS OR APPLICATIONS

25,413  10/1969  Japan ................................ 250/66

*Primary Examiner*—James W. Lawrence
*Assistant Examiner*—B. C. Anderson
*Attorney*—Fryer, Tjensvold, Feix, Phillips & Lempio

[57] ABSTRACT

A changer for sequentially exposing a plurality of film cassettes during patient X-ray procedures. A sequencer permits either automatic or semiautomatic operation of the changer. Means are further provided for selective vertical positioning of the changer with respect to an X-ray machine. Radiation detection means are optionally provided for controlling the sequencer.

18 Claims, 9 Drawing Figures

PATENTED OCT 2 1973

FIG_1

FIG_2

INVENTOR.
HOWARD A. HANSON

BY Fryer, Tjensvold, Feix, Phillips & Lempio
ATTORNEYS

X-RAY FILM SEQUENCES

BACKGROUND OF THE INVENTION

This invention is directed generally to a film cassette changer for use in X-ray applications. More particularly, this invention concerns an X-ray table for use in X-ray applications, primarily, translumbar aortography and femoral arteriography, which table has incorporated there in an automatic, film cassette changer.

Currently, serialographs are an especially valuable tool in the field of medical diagnosis. Serialographs broadly involve the taking of a plurality of X-rays at desired intervals in a sequential manner.

By injecting a suitable contrast dye into the patient's blood stream, a series of X-ray photographs may be taken at predetermined intervals to thereby ascertain various patient conditions. For example, as noted in U.S. Pat. No. 2,999,159 to Curry, it is a conventional technique in femoral arteriography to take a series of X-ray photographs of a patient's legs in order to diagnose various conditions by following the progress of a dye or tracer element in the leg arteries. Constrictions of the artery such as caused by arteriosclerosis which impede flow of blood may be readily discerned by a radiologist. Important information can be obtained from these photographs as to both the location and extent of such condition which materially assists in the performance of later surgical operative procedures.

The prior art devices have not proven entirely satisfactory for many reasons. For instance, these prior art devices tend to be rather large and difficult to handle. This materially contributes to cost in view of the additional time and effort that must be expended by the operator in managing such devices.

Critical to the achieving of medically useful, diagonostic X-rays in this area are precision in positioning and control of the sequential movement of the film cassettes. Also of extreme benefit is the capability of optionally having either automatic or semiautomatic sequencer operation.

Another problem with the prior art is the complexity and consequent high cost of the devices. Complexity in number and arrangement of parts has resulted in prior art machines being both costly to buy and maintain. An associated problem is the difficulty of loading and unloading film cassettes from these devices.

SUMMARY OF THE INVENTION

As a solution to these and other problems, there is herein provided a device for sequentially moving a plurality of film cassettes with respect to an X-ray beam. The device comprises a carriage which is latched into position with respect to the X-ray beam path and means biasing said carriage in a first direction with respect to the beam path. A sequencer provides the option of automatic or semiautomatic releasing of the latching means whereby the carriage means is actuated so as to sequentially move a plurality of film cassettes with respect to the direction of travel of the biasing means. Vertical positioning means are further provided for selective vertical positioning of the changer with respect to an X-ray machine. Radiation detection means are optionally provided for controlling the sequencer in response to X-ray machine operation.

OBJECTS OF THE INVENTION

It is, therefore, an object of this invention to provide a film cassette changer which enables the sequential movement of a plurality of film cassettes with respect to an X-ray beam path.

It is a further object of this invention to provide the film cassette changer for X-ray use having a sequencer for controlling the film changer operation.

It is a further object of this invention to provide a radiation sensor means for controlling sequencer operation.

It is a further object of this invention to provide a film cassette changer having vertical positioning means so as to enable precise positioning of the changer with respect to an X-ray machine.

It is a further object of this invention to provide an X-ray film cassette changer having a vertically-positionable table for supporting a patient for diagnostic X-ray procedures.

It is another object of this invention to provide an X-ray apparatus for sequentially changing a plurality of film cassettes wherein a plurality of the cassettes are oriented in stacked relation under the patient and beneath the beam path such that sequential removal of cassettes from the beam path enables sequential exposure of the plurality of cassettes.

It is a still further object of this invention to provide an apparatus for changing film cassettes in X-ray applications wherein the motivating means for changing is spring potential energy.

It is a further object of this invention to provide an X-ray film cassette changer device which is both easy to load and unload as well as operate.

Other objects and advantages of the present invention will become apparent from the following description and claims and as illustrated in the accompanying drawings which, by way of illustration only, show preferred embodiments of the present invention and the principles of operation thereof. It is to be understood that the scope of the invention is not to be limited thereto, but is to be determined by the scope of the appended claims.

BRIEF DESCRIPTION OF THE DRAWINGS

FIG. 8 is a circuit diagram of an auxiliary radiation sensor control, override circuit.

DETAILED DESCRIPTION

Figure 1:
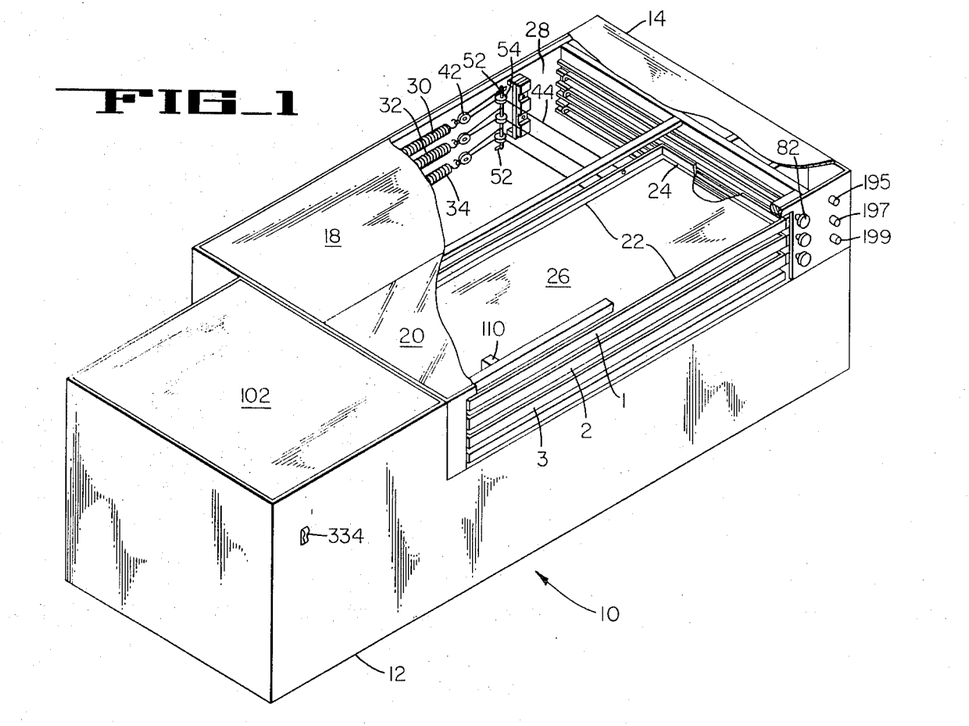
FIG. 1 is an isometric, top-quarter view, partially broken away, of an X-ray table embodying the film cassette changer of the instant invention.

Referring to the drawings, there is shown generally at 10 in FIG. 1 an X-ray table adapted for patient support which comprises the instant invention. The table itself comprises a bottom enclosure 12 and a film cassette changer module 14. The cassette changer module may be detached from the bottom enclosure in a conventional manner for facilitating moving or when it is desired to use the module alone. In this latter instance, the module would typically be placed on any convenient static support such as a table. The following discussion will first focus on the film cassette changer and associated apparatus after which a discussion of the vertical positioning mechanism will be attempted.

FILM CASSETTE CHANGER MECHANISM

Film cassette changer module 14 comprises generally a rectangularly-shaped, box-like structure which is slightly over twice the width and once the length of a standard X-ray film cassette, i.e. 14 inches by 36 inches.

Figure 5:
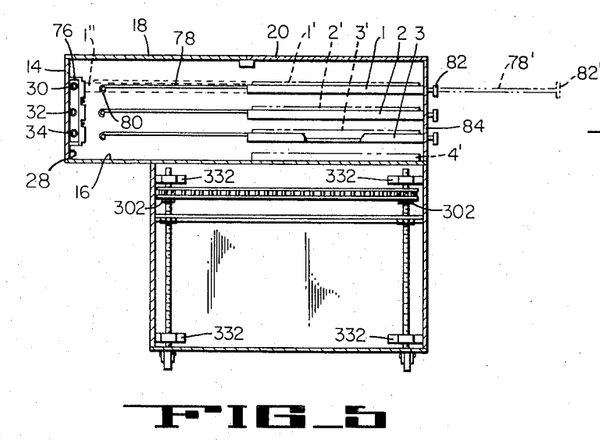
FIG. 5 is a vertical cross-sectional view taken along line 5—5 in FIG. 3 illustrating with particularity the tray return mechanism.

As best seen in FIG. 5, the film cassette changer module is adapted to hold four cassettes numbered 1' – 4' as shown in phantom line. Film cassettes 1' – 3' are contained in movable trays 1–3, respectively. It may be further noted that cassette 4' has no corresponding tray. Rather, this bottommost film cassette reposes on the bottom interior wall 16 of module 14. When in this position and with trays 1–3 containing cassettes 1' – 3', respectively, located thereover, the changer is in its cocked or operative condition as will be hereinafter described.

Returning again to FIG. 1, the module further comprises a pair of horizontally-directed top panels 18, 20 which serve to both enclose the internal mechanism of the changer module as well as to provide patient support. The changer module 14 including left top panel 18 may be made of any convenient material, including those pervious to X-rays, i.e., wood, metal, plastic, etc. The right top panel, on the other hand, which is located directly over the stack of film trays 1–3 in their cocked position, must be made of an X-ray pervious material. Means are also provided immediately under the right top panel to accommodate two standard 14 inch by 17 inch X-ray grid panels used in eliminating secondary scattered radiation emanating from the patient, thereby considerably enhancing the resultant X-ray photographs.

The trays or cassette carriage means 1–3 are conveniently, generally rectangularly-shaped structures adapted to encompass a single conventional X-ray film cassette. These trays may be fashioned, for example, by forming lightweight metal angles, e.g., aluminum or magnesium, into a generally rectangularly-shaped tray such as shown at 1. This tray is comprised of a pair of spaced, parallel, longitudinal members 22 joined by a pair of spaced, parallel, lateral members, one of which is shown at 24. Completing the box-like appearance of the tray is a rectangularly-shaped plate of lead or other X-ray impervious material 26, the purpose of which will be hereinafter described.

Figure 2:
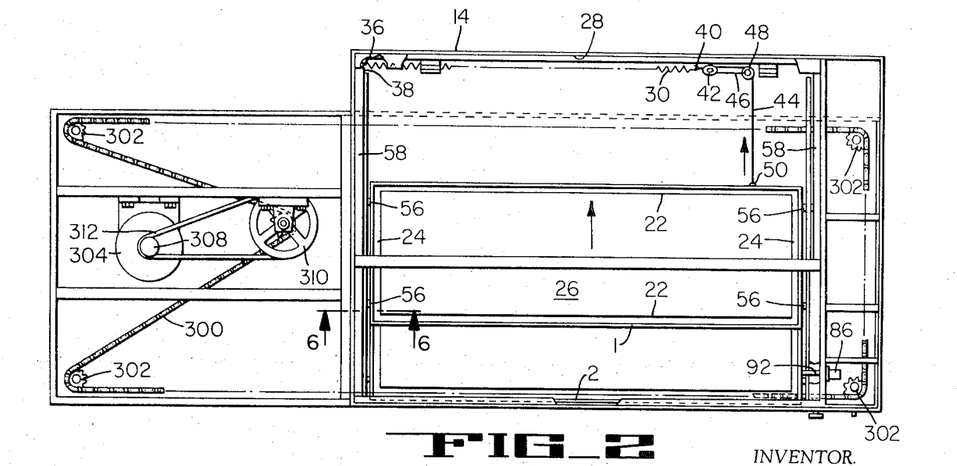
FIG. 2 is a top plan view of the same with top panels removed so as to show the internal working mechanism of the device.

Longitudinally positioned adjacent to the back interior wall 28 of the module is a plurality of springs comprising spring-biasing means 30, 32, and 34. As best seen in FIG. 2, a typical spring 30 is fixedly attached as at 1 and 36 to the side interior wall 38 by any conventional means. The other end of the spring 40 is secured to a first pulley 42 by conventional means. Completing the connection with the typical tray 1 is a cable 44 which may be made of metal, wire or rope having a first end of which is fixed to a vertical shaft 48 spaced from and fixed to wall 28 and a second end 50 fastened by conventional means to the back rail 22 of tray 1.

As best seen in FIG. 1, vertical shaft 48 is fixed at each end to wall 28 by means of a pair of pillow blocks 52 or the like. After passing through pulley 42, cable 44 is passed around a pulley 54 rotatively mounted on vertical shaft 48. By appropriately setting the spring constant of spring 30 as well as its length in relation to the length of a cable 44 and the lateral distance to be travelled by the trays, these springs provide a potential energy source or means for imparting motion to the trays.

As best seen in FIG. 2, travel in the lateral or arrow direction is made possible by use of a plurality of rollers travelling in guide rails or channels. More particularly, a pair of roller assemblies 56 is mounted on each lateral assembly 24 of representative tray 1. These roller assemblies are accommodatingly fitted for travel in the lateral direction in a pair of guide rails 58 mounted on the side interior walls of module 14.

Figure 6:
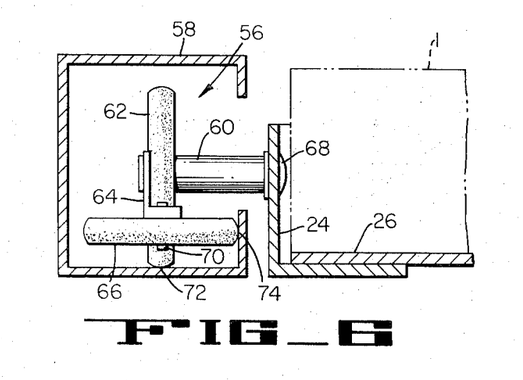
FIG. 6 is an enlarged, partial view of the double-roller support mechanism.

As shown in FIG. 6, each roller assembly 56 comprises a laterally-extending, horizontal shaft 60 to which is fixed for rotational movement a vertical roller or wheel 62. A bracket means 64 which is fixed with respect to shaft 60 serves to mount the horizontal roller or wheel 66. Shaft 60 is fixedly attached at its remaining end 68 to lateral member 24 by conventional means such as bolting or riveting. Wheel 66 is rotatively supported by pivot means 70. Wheels 62 and 66 bear against the interior walls of guard rail 58 at points 72 and 74, respectively. This provides support in two directions and facilitates movement of the trays.

Returning again to FIG. 5, the mechanism for cocking the trays in their operative position will be described. The initial position of tray 1 is shown in phantom at 1''. This position is achieved by means of spring-biasing means 30 pulling the subject tray into abutting relationship against a plurality of bumpers 76 (one of which is shown) which are mounted in a vertical orientation on the back wall 28 of module 14 so as to cushion the tray's impact. These bumpers may be made of any convenient, resilient material such as rubber.

In this position, a pull rod means 78 having an end portion 80 curved around the lattermost-oriented roller assembly rod of tray 1 (not shown) and the other end of which is capped by a pull knob 82, has said knob in abutting relationship with front panel 84 of module 14. By manually pulling knob 82 away from the front of panel 84 to the position shown at 82', the tray may be pulled by means of hook 80 on the end of rod 78 to the position shown at 1. In this position rod 78 is at position 78'. It may be noted that this movement is against the biasing force of spring 30 as transmitted to cable 44, as best seen in FIG. 2.

As also seen in this figure and in FIG. 1, the tray may then be latched into this operative position by means of solenoid-operated latch mechanisms 86, 88, 90 corresponding with trays 1, 2, and 3, respectively. Extending from representative solenoid 86 is a plunger 92. In its unretracted condition, the plunger extends into the path of one of the roller assemblies, as shown in FIG. 2, so as to prevent movement in the direction of the biasing force. Alternatively, a projection could be provided on the tray for this latching purpose. The plunger 92 would be actuateable by means of solenoid 86 out of its impeding position shown, whereupon the tray would move in the arrow direction shown until it reached the abutting relationship with the bumper 76 as shown at 1″ in FIG. 5.

Figure 3:
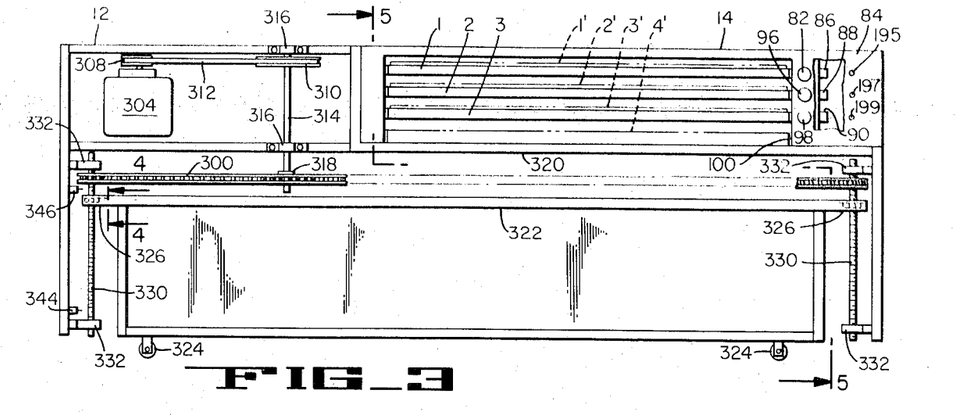
FIG. 3 is a view of the same in vertical elevation with the front panel removed.

The operation of the film cassette changer module will now be described. Later on in this disclosure, the operation of the sequencer which controls the operation of the film cassette changer through the mechanism of the solenoids will be described in detail. Before the serialographs are taken, the changer module is as shown in FIG. 1. The module is then loaded with an unexposed film cassette in each of the three trays 1–3 as well as a fourth cassette 4′ being placed on the bottom floor of the module, as best seen in FIG. 3. Knobs 82, 96, and 98 may be sequentially, manually actuated in order to pull the trays 1, 2, and 3, respectively, slightly out of the module 14 through the generally rectangularly-shaped opening 100. The fourth cassette 4′ may be merely inserted through opening 100 to its operative position.

Alternatively, front longitudinal member 22 could be hinged so as to permit insertion of a cassette without the necessity of pulling tray 1 from the module 14. Trays 2 and 3 would be similarly provided with hinge means.

A patient would then be placed on the patient support table 10 with his head in the region of top panel 102 and, if femoral arteriography is to be performed, one of his legs and pelvic regions supported on right top panel 20. The table would then be positioned under an X-ray machine (not shown) such that the X-ray beam would pass through the patient and then through X-ray-permeable or -transmissible right top panel 20.

The sequencer (not shown), once activated, would control the X-ray machine to emit a beam of proper strength and duration for exposing the topmost film cassette 1′ contained in tray 1. It may be recalled that the bottom of the trays, e.g., 26 of tray 1, is X-ray impermeable inasmuch as it is made of lead or the like. Thus, the remaining cassettes are shielded from exposing radiation at this point. Upon completion of the exposure, the sequencer would activate solenoid 86, as shown in FIG. 2, to withdraw plunger 92 and thereby unlatch the tray. The tray would move in the direction shown in the figure under the influence of biasing spring 30 until it abutted the plurality of bumpers 76 as shown by 1″ in FIG. 5.

The sequencer would then repeat this cycle by causing serial exposure of remaining cassettes 2′ – 4′. The remaining two solenoids 88, 90 would actuate, in turn, to enable withdrawal of trays 2 and 3 from the operative position under the X-ray beam to the inoperative position against bumper 76. It may be parenthetically noted that top panel 18 may be made of an X-ray impermeable material i.e., lead, in the event that X-ray scatter proved to be a problem. It may further be noted that since each tray is provided with an X-ray impermeable bottom, the remaining cassettes located thereunder in the operative position will not be exposed until the tray directly thereover has been removed. It may be still further noted that position lights 104, 106, and 108, are lighted sequentially by means hereinafter to be described as trays 1, 2, and 3, respectively, reach their inoperative position against bumpers 76.

After the serialograph has been completed, knobs 82, 96, and 98 may be sequentially, manually actuated so as to reset the trays to the operative position. The solenoids would, of course, be relatched by means of pushbutton switches as will be hereinafter described, so as to hold the trays in their operative position. The exposed cassettes could then be removed by reversing the procedure used in loading. This would complete a serialograph cycle.

It may be parenthetically noted at this juncture that an alternative embodiment would include a radiation sensor 110 located in the path of the beam. The radiation sensor or detector and associated circuitry (not shown) would override the operation of the sequencer so as to ensure delaying actuation of the subsequent tray in the series until after the X-ray exposure has been completed. The necessary circuitry will also hereinafter be described.

SEQUENCER CIRCUIT

Figures 7, 9, 11:
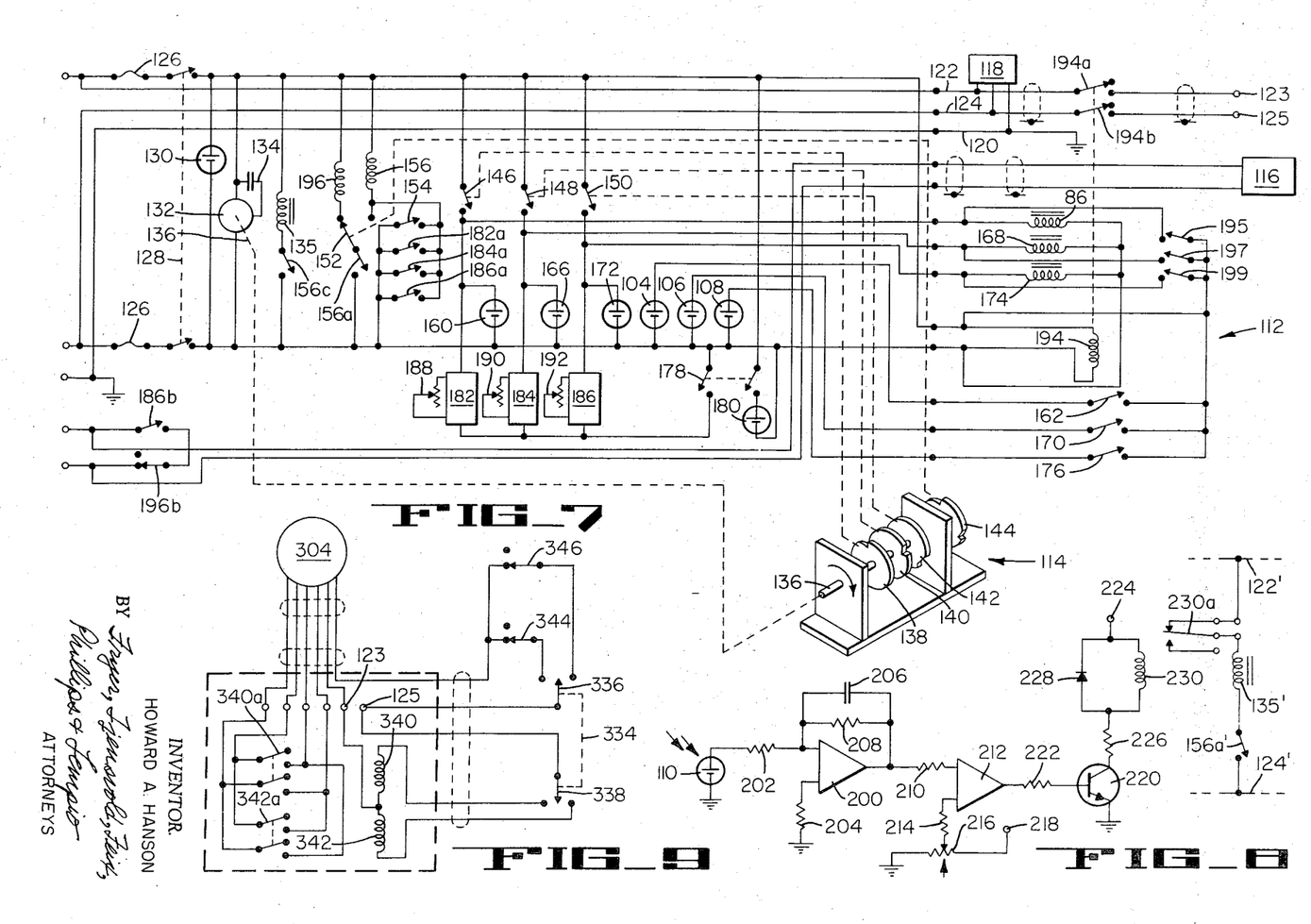
FIG. 7 is an overall circuit diagram of the sequencer.
FIG. 9 is a circuit diagram of the vertical positioning means for the table.

With particular reference to FIG. 7, there is shown generally the sequencer citcuit 112 in association with a cam mechanism 114 which forms a part of the sequencer. The following discussion will describe the circuit by means of tracing the operation first of the sequencer in the manual mode wherein tray sequencing is controlled by the operator. Secondly, the actuation of the circuit will be described in the automatic mode where automatic tray sequencing is accomplished by means of time-delay circuitry.

It should be noted at the outset that the X-ray machine 116 may be any conventional X-ray unit as is common in the art. The power supply is a conventional 110-volt source 118. One of the lines 120 from this source is conventionally grounded. The remaining two hot lines 122, 124 have located therein fuses 126 for obvious reasons.

For both the manual and automatic modes, the closing of main power switch 128 energizes main power pilot light 130. It may be parenthetically noted that all of the circuit elements, i.e., switches, etc., are shown in their normal positions. That is to say, switches shown in their open position on the circuit are normally open, and switches shown in their closed position are normally closed.

At the same time that the main power switch 128 is closed, cam-operating motor 132 is energized. Motor 132 is a conventional brake solenoid motor with capacitor 134 associated therewith. Energizing brake solenoid 135 causes power shaft 136 to rotate. Conversely, de-energizing the clutch solenoid causes the motor to be braked. Power shaft 136 has mounted thereon a plurality of cams 138, 140, 142, and 144 which operates switches 146, 148, 150, 152, respectively. Manual closing of push-button operating switch 154 completes a circuit across relay 156. This causes relay contact 156c to close and thereby energize brake solenoid 135 whereupon power shaft 136 begins to rotate. Cam-actuated switch 152 is closed by the rotation of cam 144 by means of the switch leaving a detent position on the cam.

At the same time that relay 156 is energized, relay contact 156a is closed which latches the relay in the energized position through now-closed, cam-actuated switch 152. Switch 152 will remain closed until cam 144 reaches another detent position as will be hereinafter described.

Also at the same time that relay 156 is energized, relay contact 156b closes causing the initiation of operation of X-ray machine 116. Normally, the timing of the X-ray would be set internally in the X-ray machine and would be completed prior to activation of solenoid 86 controlling the tray 1 actuation. This is accomplished by setting a detent position on cam 138 which is associated with cam-operated switch 146 at a point on said cam sufficiently removed that the X-ray duration desired could occur. As the shaft continues to rotate, cam 138 rotates to this predetermined detent which causes switch 146 to close.

Closing of switch 146 accomplishes several functions. First of all, pilot light 160 is energized and solenoid 86 which latches the topmost tray (not shown) is also energized. Push-button, position-marker switch 162 in the path of tray 1 (not shown) is closed by the tray reaching its full limit of travel. This causes pilot light 104 to be energized. After actuation of solenoid 86, power shaft 136 continues to rotate until another detent in cam 144 is reached and switch 152 is again opened. Opening of switch 152 causes relay 156 to be de-energized which, in turn, opens relay contacts 156a, 156b, and 156c. Opening of relay contact 156c de-energizes brake solenoid 135 and power shaft 136 stops rotating.

A new cycle is commenced by again manually depressing operating push-button switch 154 which results in the closing of cam-operated switch 148 by cam 140 and the lighting of pilot light 166 and the energizing of solenoid 168 controlling tray 2 (not shown). At the completion of its travel, this tray actuates pushbutton, position-marker switch 170 which lights pilot light 106.

A third actuation of operating switch 154 will initiate yet another cycle which results in the closing of cam-operated switch 150 by cam 142 and the lighting of pilot light 172 and the energizing of solenoid 174 so as to release tray 3 (not shown). Again, the push-button marker switch 176 is closed by tray 3 completing its travel, and pilot light 108 is energized. Since the fourth cassette is stationary, the only occurrence as the cams continue to rotate is that another X-ray photograph is initiated by the closing of contact 156b, and the cams return to their reset position in preparation for another serialograph. At this point, shaft 136 and its cams will have made a completed revolution and switch 152 will be at the initial detent position. The automatic mode of operation will now be described.

In the automatic mode, the initial steps for manual operation, i.e., main power switch 128, pilot light 130, and motor 132, are followed in that order. Automatic sequence switch 178 having pilot light 180 associated therewith is manually closed. This both energizes the pilot light as well as places three time-delay relays 182, 184, 186 on line. These relays may be manually set to provide varying time delays between tray actuation by means of a slide wire or other rheostat means 188, 190, 192, respectively, as is conventionally known in the art. Of course, these would normally be preset before commencement of a serialograph sequence. The length of time required would, of course, depend on the duration of X-ray as well as the time required to remove a tray from the operative position. This can normally be found by experimentation.

As with the manual mode of operation previously discussed, the automatic mode is initiated by depressing and releasing push-button switch 154. This again causes the energizing of relay 156. As with the manual mode, relay contact 156a closes and latches the relay into the energized position. In addition, contact 156b also closes to actuate X-ray machine 116. Simultaneously, contact 156c closes and energizes clutch solenoid 135. Thus, motor 132 drives shaft 136 which rotates the cams including cam 138 to a detent position so as to close switch 146. Closing of this switch energizes pilot light 160 and the first tray solenoid 86. The first tray reaches its limit of travel and closes pushbutton marker switch 162 to light pilot light 104.

At the same time that switch 146 closes, time-delay relay 182 is also energized. After a time interval preset by rheostat means 188, relay contact 182a closes. This contact is in parallel with now-open, pushbutton switch 154. Thus, relay 156 is again energized so as to begin another cycle. The cycle is repeated until the third tray is released by solenoid 174. A fourth and last X-ray photograph is taken and the cams return to the reset position, as more fully described above with the manual mode. It may be noted that the circuitry also includes a relay 194 having contacts 194a and 194b. This relay closes when main power switch 128 is closed so as to power for the circuitry for a table lift mechanism to be hereinafter described by way of terminals 123, 125. It may be further noted that the circuitry contains switches 195, 197, and 199, which are individually, manually actuable so as to permit each of the trays to be relatched in their operative position.

Also included in the circuit is relay 196 having contacts 196b with both the manual and semiautomatic modes. This relay is energized by cam-operated switch 152 returning to its normal position and before contact 156a opens. The purpose of this relay is to momentarily open the X-ray machine timer circuit in order that it may reset itself for a subsequent exposure.

RADIATION DETECTOR CIRCUIT

As an alternative embodiment, the circuit shown in FIG. 7 can be amplified by the addition of the radiation detector or sensor circuit shown in FIG. 8. Circuit elements having analogous correspondence in the first embodiment are marked with primes.

As shown in the figure, detector 110 has one side grounded and the other side connected to one input of operational amplifier 200 through resistor 202. The other input of amplifier 200 is grounded through a resistor 204. A feedback loop is comprised of capacitor 206 and resistor 208 connected in parallel across the first input and output of the amplifier.

The output of amplifier 200 is connected through resistor 210 to a first input of a second amplifier 212. The second input of amplifier 212 is connected through resistor 214 to a slide wire potentiometer 216 which has one end connected to a D.C. power source at 218 and the other end grounded.

The output of amplifier 212 is connected to the base of transistor 220 through resistor 222. The emitter is grounded while the collector is connected to a conventional D.C. power source by means of a series resistor 226 and a parallel connection of diode 228 and a relay 230. The function of the diode is to protect the relay from current transients during power loss.

The operation of this circuit is as follows. Since relay contact 230a is located in the circuit between brake solenoid 135' and power lines 122' and 124', the operation of the brake solenoid and consequently the cam mechanism of the sequencer can be overridden by the radiation detector circuit. Thus, if an X-ray is in progress, radiation sensed by detector 110 will cause a current to energize relay 230 to open contact 230a and thereby prevent tray actuation by the cams. Completion of the X-ray results in a loss of radiation to detector 110 and relay 230 will be de-energized to once again close contacts 230a. The sensor or detector 110 may be conveniently a conventional silicon solar cell. Actuation is accomplished by means of radiation striking fluorscent material of the cell which causes it to emit light rays to be picked up by a solar cell.

Adjustment of sensitivity is accomplished by means of slide wire potentiometer 216. Moving the slide wire toward ground would tend to increase sensitivity, while moving it away from ground would tend to decrease sensitivity.

TABLE LIFT MECHANISM

Turning again to FIG. 2, there is shown a table lift mechanism which comprises an endless chain 300 driven over a plurality of sprockets 302 by means of a motor 304. The motor is a conventional reversible, electric motor having a belt drive sprocket 308 linked to the shaft sprocket 310 by means of a belt 312.

Figure 4:
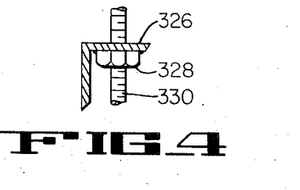
FIG. 4 is a cross-sectional view taken along line 4—4 in FIG. 3 illustrating a portion of vertical positioning mechanism.

As best seen in FIG. 4, sprocket 310 is fixedly mounted to a vertically-oriented shaft 314 which is, in turn, rotatively supported by a pair of pillow blocks 316. At one extremity of shaft 314 is mounted a chain for drive sprocket 318 for driving chain 300 in either direction.

The bottom enclosure 12 basically comprises an upper frame portion 320 containing most of the upper working mechanism and a lower frame portion 322 which supports the former by means of a plurality of wheels or castors 324.

At each corner of the lower frame portion is an extension or projection of 326 which may be conveniently an angle to which is welded or otherwise fixed a threaded bolt means 328, as best seen in FIG. 4. Passing through each bolt means is a threaded shaft 330 which threadably engages the threaded bolt means as best seen in FIGS. 3 and 5. The free end of each threaded shaft is rotatively mounted in a pillow block 332. Rotation of shaft 330 causes the upper frame portion to be raised or lowered in respect to the lower frame portion.

CIRCUITRY FOR LIFT TABLE MECHANISM

Returning to FIG. 9, there is shown an electrical circuit for operating the table lift mechanism. Motor 304 is suitably connected to a switch 334 contained on the face of enclosure 12, as shown in FIG. 1. This switch is comprised of switches 336 and 338 for upward and downward motion, respectively. Also included are motor relays 340 and 342 controlling the relay contacts 340a and 342a, respectively. Also included are upward and downward limit switches 344 and 346, respectively. As best seen in FIG. 3, these limit switches may be physically installed on the internal wall of the enclosure 12 so as to be the path of projection 326 and thereby limit the travel of the lift table.

It is understood that the foregoing description is merely illustrative of preferred embodiments of the invention; and the scope of the invention is not to be limited thereto, but is to be determined by the scope of the appended claims.

What is claimed is:

1. A device for sequentially moving a plurality of X-ray film cassettes with respect to the path of an X-ray beam, comprising:
   a housing having means for moving X-ray film cassettes in a first direction with respect to the beam path, wherein
   said means for moving X-ray film cassettes comprises tray means for containing X-ray film cassettes, guide means for guiding said tray means in said first direction,
   and means biasing said tray means in said first direction whereby release of said latching means causes said tray means to move in said first direction, and
   wherein the improvement comprises a sequencer means for controlling said means for moving said cassettes in a predetermined sequential order, wherein said sequencer means comprises:
   a source of power,
   a motor means operable by said power source,
   a cam mechanism including cam means driven by shaft means,
   means intermediate said shaft means and said motor means for selectively coupling said shaft means to said motor means,
   switch means actuable by said cam means for actuating said latching means, and
   operating switch means for controlling the means intermediate said shaft means and said motor means whereby rotation of said cam means accomplishes sequential actuation of said tray means through said latching means.

2. The invention of claim 1 wherein said guide means comprises guide rails and wherein said tray means comprises trays adapted to receive X-ray film cassettes and roller means on said trays operatively associated with said guide rails whereby said trays may be motivated in the direction of said guide rails.

3. The invention of claim 2 wherein the trays and associated guide rails are arranged in stacked, spaced relation in the X-ray beam path in their operative position for making exposures and said first direction is transverse to the beam path whereby sequential removal of trays allows exposure of a series of X-ray film cassettes.

4. The invention of claim 3 wherein said trays comprise bottom portions of X-ray impermeable material whereby exposure of the next higher tray in the stack of trays will not expose the tray directly below said next higher tray.

5. The invention of claim 4 further including provision in said housing for supporting an X-ray film cassette directly below said stack of trays in their operative position.

6. The invention of claim 1 wherein said means biasing said tray means comprises spring means.

7. The invention of claim 1 further including bumper means in the path of movement of said tray means for cushioning impact of said tray means.

8. The invention of claim 1 further including means for returning said tray means to its operative position against the force of said biasing means.

9. The invention of claim 1 wherein said sequencer means further comprises manual operating means whereby said means for moving said cassettes is manually controlled by an operator as well as, automatic operating means whereby said means for moving said cassettes is automatically controlled without the intervention of an operator.

10. The invention of claim 1 further including time delay means for controlling said latching means whereby automatic sequencing of said tray means is accomplished.

11. The invention of claim 1 further including position marker means associated with said tray means for indicating when said tray means has reached its limit of travel subsequent to sequencing.

12. The invention of claim 1 wherein said sequencer means further comprises means for controlling the operation of an X-ray machine so as to integrate X-ray exposure to sequencing of the tray means.

13. The invention of claim 1 wherein said latching means comprise solenoids and further including switch means for actuating said solenoids so as to reset said tray means in the operative position.

14. The invention of claim 1 further including radiation-detector circuitry circuitry having a radiation detector means positioned so as to be in the X-ray beam path for overriding the operation of said sequencer means so that sequencing of a tray means will be prevented until after the X-ray exposure has been completed.

15. The invention of claim 14 wherein said radiation detector circuitry means further comprises means for adjusting the sensitivity of said radiation detector means.

16. The invention of claim 1 further including a support means supporting said housing and vertical positioning means operatively associated with said support means for selectively raising and lowering said support means and thereby said housing.

17. The invention of claim 16 wherein said support means comprises an upper enclosure supporting said housing and a lower enclosure positioned therebelow, and wherein said vertical positioning means comprises:

a power source, reversible motor means operable by said power source, manually-operable control circuit means for selectively communicating power to operate said motor means in either the forward or reverse directions, and means interconnecting said upper and lower enclosures operable by said motor means to vertically position said upper with respect to said lower enclosure.

18. The invention of claim 17 wherein said control circuit means further comprises limit switch means for limiting the vertical movement of said upper support means with respect to said lower support means.

* * * * *

UNITED STATES PATENT OFFICE
CERTIFICATE OF CORRECTION

Patent No. 3763370           Dated 10/2/73

Inventor(s) HOWARD A. HANSON

It is certified that error appears in the above-identified patent and that said Letters Patent are hereby corrected as shown below:

In the title, change "X-RAY FILM SEQUENCES" to --X-RAY FILM SEQUENCER--.

Column 11, line 24, change "circuitry circuitry" to --circuitry means--.

Signed and sealed this 26th day of March 1974.

(SEAL)
Attest:

EDWARD M. FLETCHER, JR.          C. MARSHALL DANN
Attesting Officer                 Commissioner of Patents